United States Patent
Nishida

(10) Patent No.: US 7,616,813 B2
(45) Date of Patent: Nov. 10, 2009

(54) BACKGROUND AREA EXTRACTION IN DOCUMENT LAYOUT ANALYSIS

(75) Inventor: Hirobumi Nishida, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 635 days.

(21) Appl. No.: 11/201,366

(22) Filed: Aug. 11, 2005

(65) Prior Publication Data

US 2006/0039608 A1 Feb. 23, 2006

(30) Foreign Application Priority Data

Aug. 18, 2004 (JP) ............................. 2004-238026
Jan. 5, 2005 (JP) ............................. 2005-000769

(51) Int. Cl.
*G06K 9/34* (2006.01)
*H04N 1/38* (2006.01)

(52) U.S. Cl. ........................ 382/173; 382/203; 358/464

(58) Field of Classification Search ......... 382/162–180, 382/190, 195, 203–206; 358/464
See application file for complete search history.

(56) References Cited

U.S. PATENT DOCUMENTS 5,430,808 A * 7/1995 Baird et al. ................. 382/176
5,555,362 A * 9/1996 Yamashita et al. .......... 715/209
5,647,021 A 7/1997 Baird et al.
5,699,453 A * 12/1997 Ozaki .......................... 382/176
6,798,895 B1 * 9/2004 Takahashi .................... 382/101
7,317,833 B2 * 1/2008 Kaneda ....................... 382/176

FOREIGN PATENT DOCUMENTS

JP 11-250041 9/1999
JP 2000-67158 3/2000
JP 2000-113103 4/2000

OTHER PUBLICATIONS

Henry S. Baird, "Background Structure in Document Images" in H. Bunke, P.S.P. Wang, and H.S. Baird, Eds., Document Image Analysis, World Scientific, Singapore, pp. 17-34, 1994.
T.M. Breuel, "Two Geometric Algorithms for Layout Analysis" In Proceedings of IAPR Workshop on Document Analysis Systems, Princeton, NJ, USA, pp. 1-12, 2002.

* cited by examiner

*Primary Examiner*—Daniel G Mariam
*Assistant Examiner*—Manav Seth
(74) *Attorney, Agent, or Firm*—Dickstein Shapiro LLP

(57) ABSTRACT

An apparatus, method, system, computer program and product, each capable of extracting a background area of a document image. The background area of the document image may be extracted by repeating recursively the acts of: extracting a set of white rectangles from a processed area of the document image; dividing the processed area into a plurality of segments using the set of white rectangles as a separator; storing the plurality of segments; and reading the plurality of segments in a predetermined order as a processed area.

20 Claims, 15 Drawing Sheets

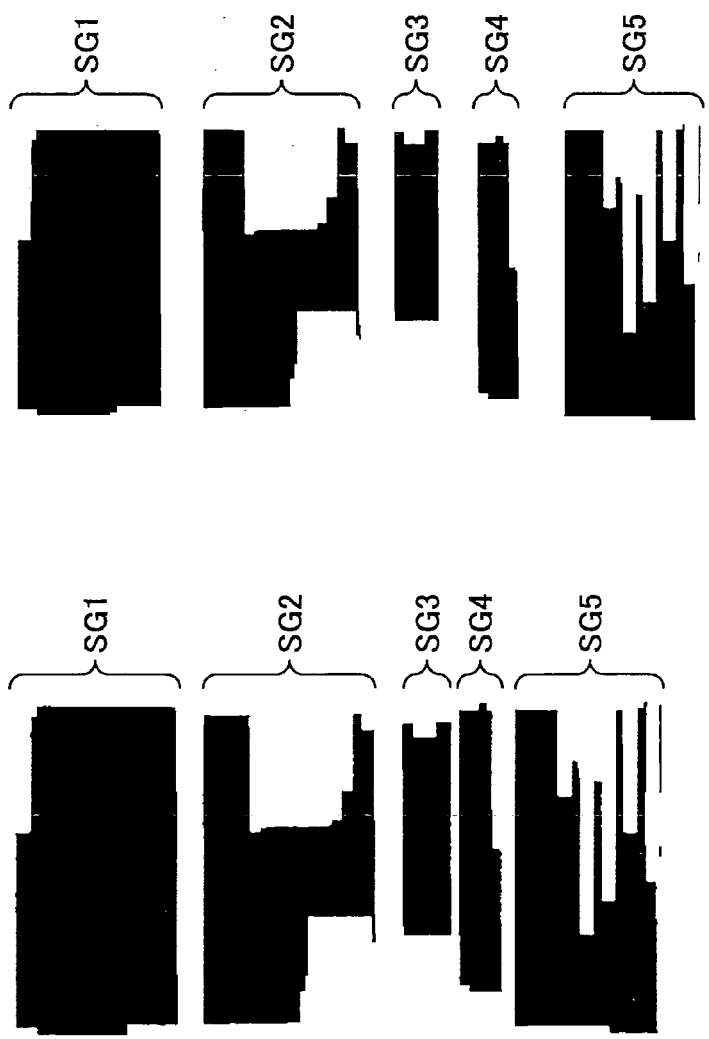

FIG. 10
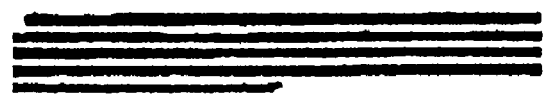
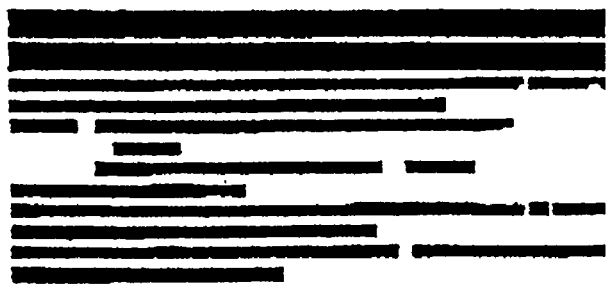

BACKGROUND AREA EXTRACTION IN DOCUMENT LAYOUT ANALYSIS

CROSS-REFERENCE TO RELATED APPLICATIONS

This patent application is based on and claims priority to Japanese patent application Nos. 2004-238026 filed on Aug. 18, 2004, and 2005-000769 filed on Jan. 5, 2005, in the Japanese Patent Office, the entire contents of which are hereby incorporated by reference.

FIELD OF THE INVENTION

The following disclosure relates generally to an apparatus, system, method, computer program, and product, for background area extraction in document layout analysis.

DESCRIPTION OF THE RELATED ART

To convert a document image into an electronic form, document layout analysis is often applied. The document layout analysis segments the image into different kinds of components, such as characters, character lines, paragraphs, columns, figures, etc. While a wide variety of other methods and algorithms exist, background analysis methods have attractive properties. For example, they are applicable to a wide variety of languages and layout structures, while having ability to distinguish noise in the document image.

In the background analysis methods, rectangles ("white rectangles") covering white pixels, i.e., covering no black pixels, are extracted as a background area. For example, the white rectangles may be extracted from a document image in an order that maximizes the rectangle areas until a certain stopping rule applies. Using these white rectangles as a separator, the document image is divided into different kinds of components. However, these background analysis methods may suffer from some disadvantages. For example, extracting the white rectangles from the entire document image may be time consuming, especially when the document image has complicated layout structures.

BRIEF SUMMARY OF THE INVENTION

Exemplary embodiments of the present invention includes an apparatus, method, system, computer program and product, each capable of extracting a background area of a document image. The background area of the document image may be extracted by repeating recursively the acts of: extracting a set of white rectangles from a processed area of the document image; dividing the processed area into a plurality of segments using the set of white rectangles as a separator; storing the plurality of segments; and reading the plurality of segments in a predetermined order as a processed area.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 7 is an illustration of a first set of white rectangles extracted from a document image according to an exemplary embodiment of the present invention;

FIG. 8 is an illustration of a plurality of first segments according to an exemplary embodiment of the present invention;

FIG. 9 is an illustration of a plurality of second segments according to an exemplary embodiment of the present invention;

FIG. 10 is an illustration of a background area extracted from a document image according to an exemplary embodiment of the present invention;

DETAILED DESCRIPTION OF THE INVENTION

Figure 1:
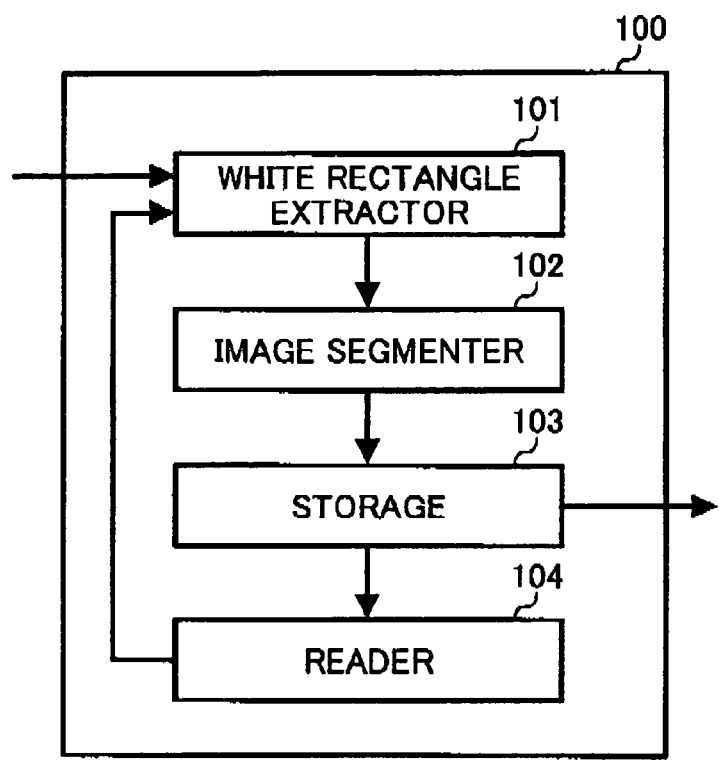
FIG. 1 is a functional block diagram illustrating a background extraction apparatus according to an exemplary embodiment of the present invention.

In describing the preferred embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 1 illustrates a background extraction apparatus 100 according to an exemplary embodiment of the present invention.

The background extraction apparatus 100 is capable of extracting a background area from a document image, which may be used in document layout analysis. As shown in FIG. 1, the background extraction apparatus 100 includes a white rectangle extractor 101, an image segmenter 102, a storage device 103, and a reader 104.

The white rectangle extractor 101 receives a document image from the outside. The document image is preferably a binary image having a foreground area containing black pixels and a background area containing white pixels. In this exemplary embodiment, the white rectangle extractor 101 forms a rectangle, which overlaps none of black pixels of a processed area of the document image. The processed area may correspond to the entire document image or a portion of the document image. As a result, one or more white rectangles may be extracted from the processed area.

Alternatively, the white rectangle extractor 101 may be previously provided with information regarding the foreground area of the processed area. For example, the background extraction apparatus 100 may additionally include a black rectangle extractor (not shown).

Figure 2:
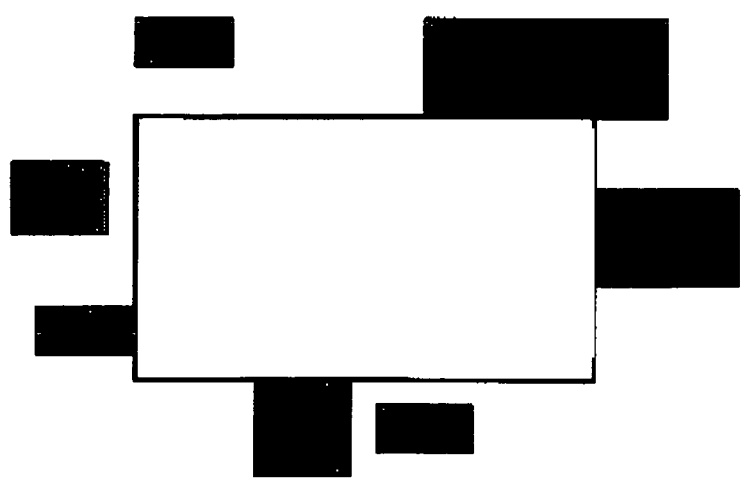
FIG. 2 is an illustration of an exemplary white rectangle extracted from a processed area of a document image according to an exemplary embodiment of the present invention.

The black rectangle extractor forms a rectangle based on a continuous run of black pixels detected in the processed area. As a result, one or more black rectangles may be extracted from the processed area, as indicated by the "black rectangles" in FIG. 2. Based on the information regarding the black rectangles, the white rectangle extractor 101 extracts a white rectangle overlapping none of the black rectangles, as indicated by the white rectangle in FIG. 2.

The image segmenter 102 divides the processed area into a plurality of segments using the white rectangles as a separator. The storage device 103 stores the segments. The reader 104 reads the segments from the storage device 103, in a predetermined order, as processed areas to be processed by the white rectangle extractor 101.

Figure 3:
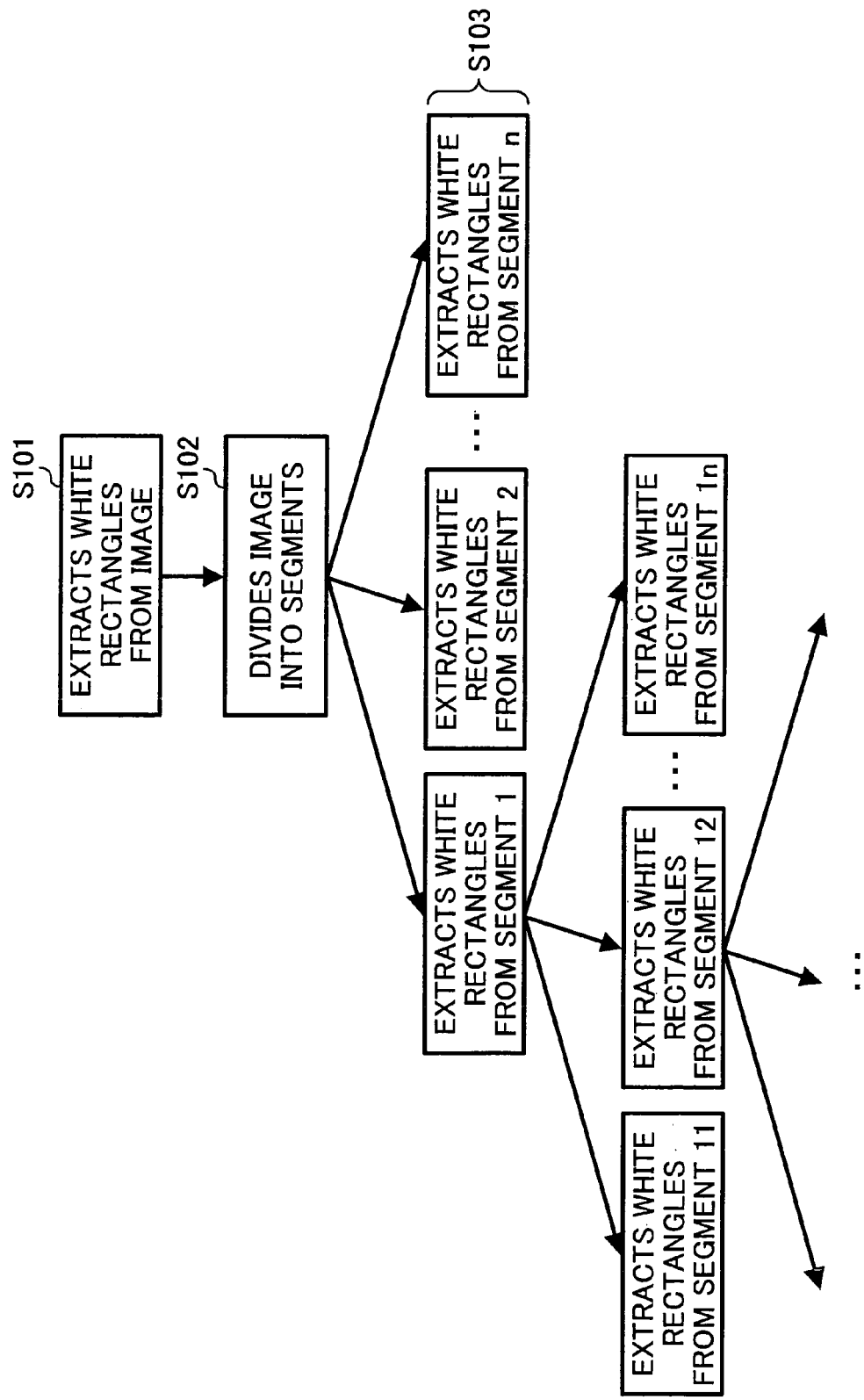
FIG. 3 is an illustration of a recursive operation performed by the background extraction apparatus of FIG. 1, according to an exemplary embodiment of the present invention.

In this exemplary embodiment, the above-described operation performed by the background area extractor 101, the image segmenter 102, the storage device 103, and the reader 104 is repeated recursively as illustrated in FIG. 3. With this recursive operation, the background extraction apparatus 100 can extract a background area of the document image in a predetermined order at relatively a high speed.

For example, if the document image is assumed to include components including characters, character lines, paragraphs, and columns, the white rectangle extractor 101 extracts a set of white rectangles functioning as a column separator, a set of white rectangles functioning as a paragraph separator, a set of white rectangles functioning as a character line separator, and a set of white rectangles functioning as a character separator, in this order. Accordingly, the image segmenter 102 divides the document image into columns using the column separator, the columns into paragraphs using the paragraph separator, the paragraphs into character lines using the character line separator, and the character lines into characters using the character separator.

Referring back to FIG. 3, this recursive operation is described according to an exemplary embodiment of the present invention.

In Step S101, the white rectangle extractor 101 extracts a first set of white rectangles from a document image, which can function as a separator for dividing the document image into segments having relatively large areas, such as columns.

In Step S102, the image segmenter 102 divides the document image into a plurality of first segments 1 to n using the first set of white rectangles as a separator, and stores the plurality of first segments 1 to n in the storage device 103.

In Step S103, the reader 104 reads out the first segments 1 to n in a predetermined order from the storage device 103. From each of the first segments 1 to n, the white rectangle extractor 101 extracts a second set of white rectangles, which can function as a separator for dividing the first segments into second segments having smaller areas, such as paragraphs.

The image segmenter 102 divides each of the first segments 1 to n using the second set of white rectangles as a separator. For example, the image segmenter 102 divides the first segment 1 into a plurality of second segments 11 to 1n, and stores the plurality of second segments 11 to in 1n the storage device 103.

In this exemplary embodiment, Step S103 may be repeated recursively until a background area of the document image is extracted from the document image. In one example, the recursive operation may be performed until spaces between columns are extracted from the document image. In another example, the recursive operation may be performed until spaces between paragraphs are extracted from the document image. In another example, the recursive operation may be performed until spaces between character lines are extracted from the document image. In another example, the recursive operation may be performed until spaces between characters are extracted from the document image.

Figure 4:
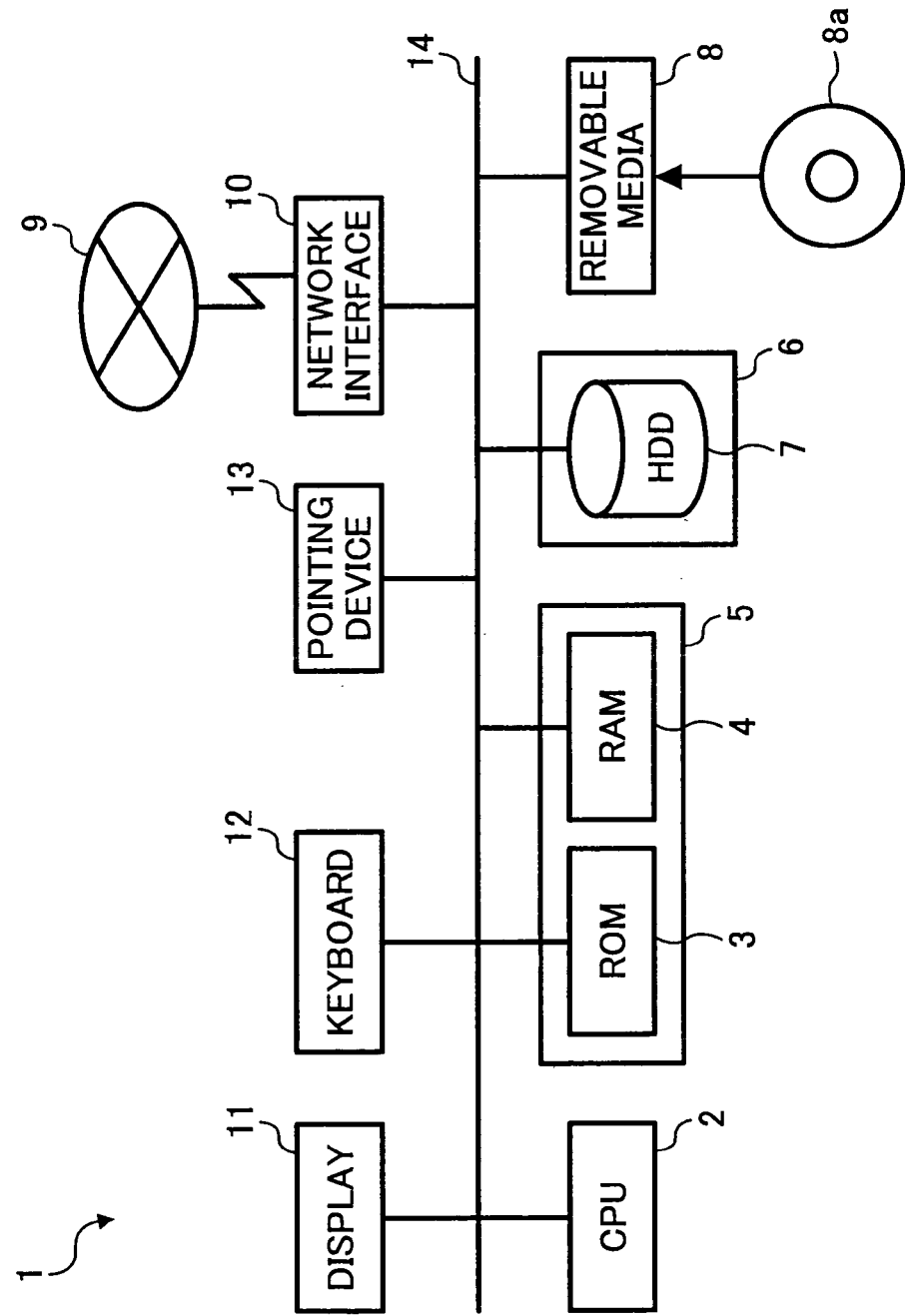
FIG. 4 is a schematic block diagram illustrating an image processing apparatus according to an exemplary embodiment of the present invention.

The background extraction apparatus 100 of FIG. 1 may be implemented in various ways, for example, as an image processing apparatus illustrated in FIG. 4. The image processing apparatus 1 may be implemented in various ways, including a personal computer, personal digital assistant (PDA) device, palmtop computer, cellular phone, personal handy system (PHS), for example.

The image processing apparatus 1 includes a central processing unit (CPU) 2, a first storage device 5 including a read only memory (ROM) 3 and a random access memory (RAM) 4, a second storage device 6 including a hard disk drive (HDD) 7, a removable media apparatus 8, a network interface 10, a display device 11, a keyboard 12, and a pointing device 13, which are connected to one another via a bus 14.

The CPU 2 includes any kind of processor capable of controlling the entire operation of the image processing apparatus 1. The first storage device 5 stores various data in the ROM 3 or the RAM 4. The second storage device 6 stores various data including a document image obtained from the outside, or various kinds of operating system (OS) and application programs to be operated by the CPU 2.

The removable media apparatus 8 is capable of reading or writing data from or onto a removable medium 8a. Examples of the removable medium 8a include, but are not limited to, flexible disk, hard disk, optical discs, magneto-optical discs, magnetic tapes, involatile memory cards, ROM, etc.

The network interface 10 allows the image processing apparatus 1 to communicate with other devices via a network 9, including the Internet or a local area network (LAN).

The display device 11 includes any kind of device capable of displaying various data to a user, such as a cathode ray tube (CRT) or liquid crystal display (LCD).

The keyboard 12 allows the user to input various data such as a command. The pointing device 13, including a mouse, allows the user to select various data.

In an exemplary operation, when the CPU 2 is activated by a user, the CPU 2 starts up a loading program stored in the ROM 3, and loads the OS program from the HDD 7 onto the RAM 4. At the same time, the CPU 2 loads an image processing program of the present invention from the HDD 7. According to the image processing program, the CPU 2 may perform an operation of extracting a background area of a document image.

Instead of loading from the HDD 7, the image processing program of the present invention may be installed from the removable medium 8a, or it may be downloaded from the network 9 via the network interface 10.

Figure 5:
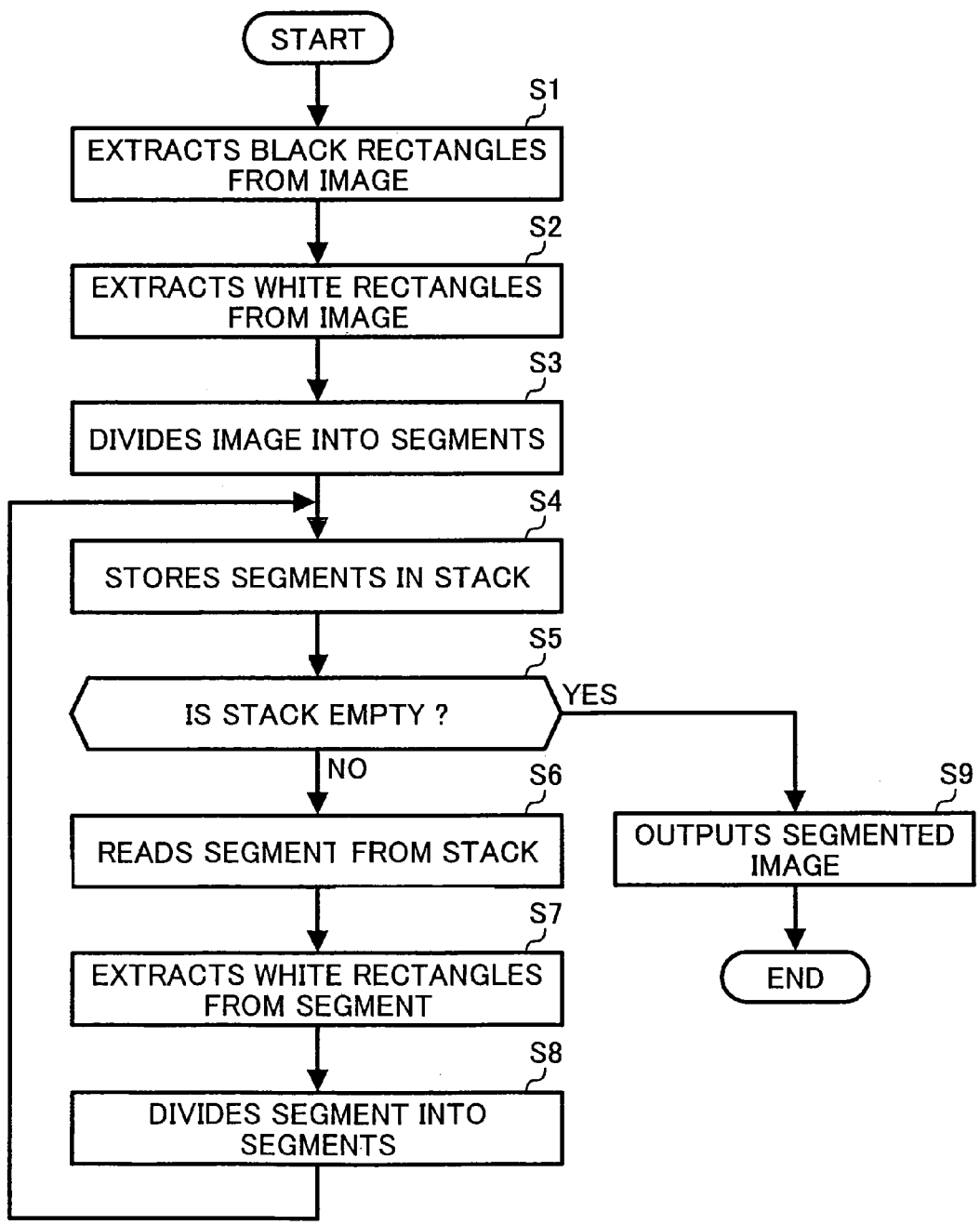
FIG. 5 is a flowchart illustrating an operation of extracting a background area of a document image, according to an exemplary embodiment of the present invention.

Referring now to FIG. 5, an operation of extracting a background area of a document image is described according to an exemplary embodiment of the present invention. The steps illustrated in FIG. 5 are performed by the CPU 2 when a command is input through the keyboard 12 or the pointing device 13. Upon receiving the command, the CPU 2 generates a binary document image from a document image input to the image processing apparatus 1. Further, the CPU 2 may apply pre-processing to the document image. For example, the CPU 2 may correct skew of the document image if the document image is skewed.

Figure 6:
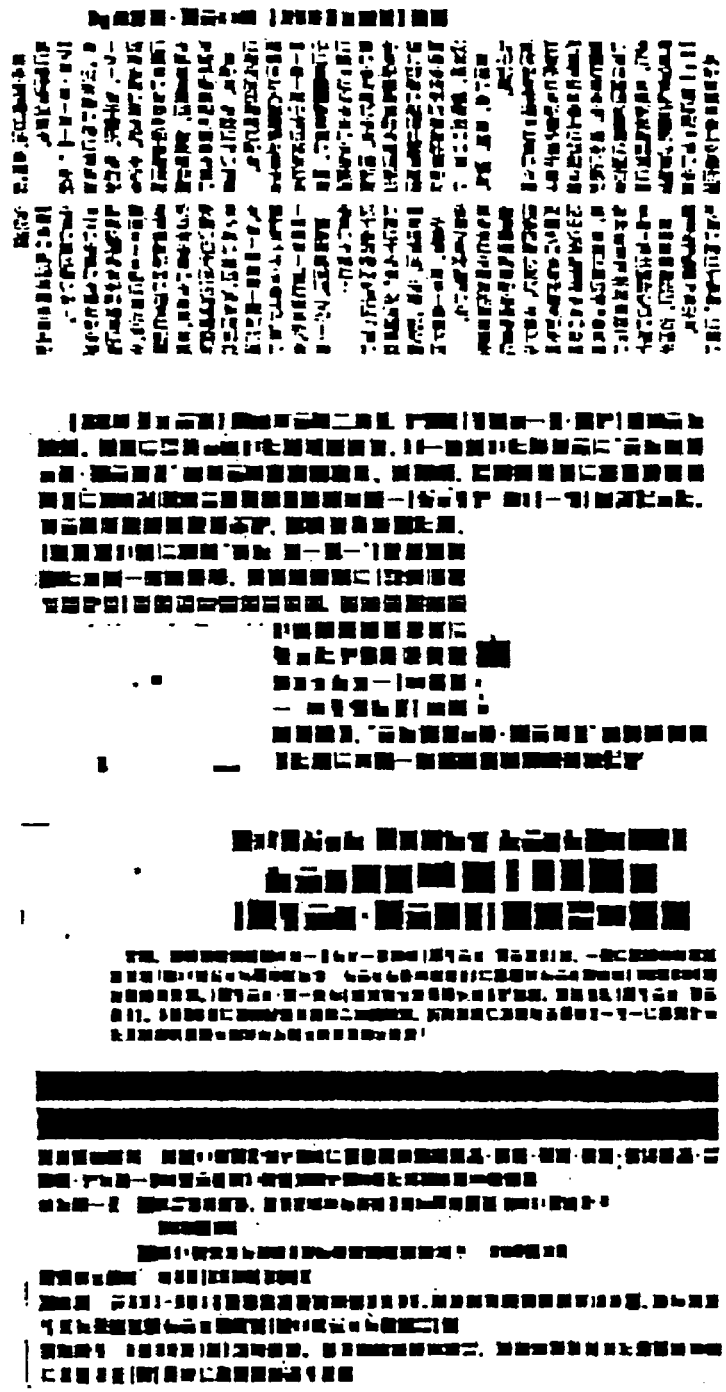
FIG. 6 is an illustration of a plurality of black rectangles extracted from a document image according to an exemplary embodiment of the present invention.

Step S1 extracts a plurality of black rectangles $r_i$ from the document image. The black rectangle $r_i$ may be obtained by using any kind of the known methods, for example, based on a continuous run of black pixels detected in the document image. As a result, a plurality of black rectangles $r_i$ may be obtained as illustrated in FIG. 6. The plurality of black rectangles $r_i$ may be expressed as a set C:

$$C=\{r_0, r_1, \ldots, r_n\}=\{r_i: i=0, 1, \ldots, n\}.$$

Further, in this exemplary embodiment, the set C, i.e., the plurality of black rectangles $r_i$ is assumed to be a subset of an overall rectangle $r_b$ corresponding to the document image, as described in the equation: $r_i r$.

Step S2 extracts a first set of white rectangles r1 from the document image. First, a plurality of white rectangles r may be obtained by excluding the set C of the black rectangles $r_i$ from the overall rectangle $r_b$. Accordingly, the plurality of white rectangles r covering none of the black rectangles $r_i$ is obtained.

Next, a first set of white rectangles r1 is selected from the plurality of white rectangles r so as to maximize the value of the evaluation function Q(r1), which is equal to or larger than a lower boundary value t. In this exemplary embodiment, the evaluation function value is assumed to be the area of the white rectangle r, however, any other parameters relating to the rectangle r may be used.

To extract the first set of white rectangles r1 that can maximize the value of the evaluation function Q(r1), the CPU 2 may calculate the value using the evaluation function Q(r) for each of the plurality of white rectangles r, and lists the plurality of white rectangles r in an order determined by the values of the evaluation functions Q(r). In this exemplary embodiment, the white rectangle r having the largest evaluation function value is listed first, while the white rectangle r having the smallest evaluation function value is listed last.

Then, one or more white rectangles r having the evaluation functions value smaller than the lower boundary value t are eliminated. In this exemplary embodiment, the lower boundary value t is defined based on the processed area of the document image, which is currently processed by the CPU 2, as described in the following equation:

$$t=a*\min(w, h).$$

In the above equation, the value a corresponds to an arbitrary constant. The value w corresponds to a width of the processed area. The value h corresponds to a height of the processed area. Since the processed area corresponds to the entire document image in this step, the value h corresponds to a height of the entire document image, while the value w corresponds to a width of the entire document image. Further, the width w, which is smaller than the height h, is selected to be multiplied with the constant a to obtain the lower boundary value t.

As a result, the first set of white rectangles r1 having relatively large areas may be extracted from the document image of FIG. 6, as illustrated in FIG. 7 (indicated by the "white areas").

Step S3 divides the document image into a plurality of first segments using the first set of white rectangles r1 as a separator. The first segments preferably correspond to main components of the document image, such as columns, for example. As illustrated in FIG. 7, the document image of FIG. 6 may be divided into five first segments SG1, SG2, SG3, SG4 and SG5.

Step S4 stores the plurality of first segments in a stack. In this exemplary embodiment, the first segment generated using the white rectangle r1 having the largest evaluation function value is stored first, while the first segment generated using the white rectangle r1 having the smallest evaluation function value is stored last. As a result, all the first segments SG1 to SG5 are stored in the stack as illustrated in FIG. 8.

Step S5 determines whether the stack is empty. If the stack is empty ("YES" in Step S5), the operation proceeds to Step S9. Otherwise ("NO" in Step S5), the operation proceeds to Step S6.

Step S6 reads the first segments from the stack in a predetermined order. In this exemplary embodiment, the first segment stored last is read first, while the first segment stored first is read last.

Step S7 extracts a second set of white rectangles r2 from each of the first segments read in Step S6. For example, as illustrated in FIG. 9, a second set of white rectangles r2 may be extracted from the segments SG 1 to 5 of FIG. 8 in a substantially similar manner as descried referring to Step S2. Since the lower boundary value t is defined based on the processed area of the document image, i.e., the first segment in this step, the second set of white rectangles r2 extracted in Step S6 have areas smaller than the areas of the first set of white rectangles r1 extracted in Step S2.

Step S8 divides each of the first segments into a plurality of second segments using the second set of white rectangles r2 as a separator, and the operation returns to Step S4 to store the second segments in the stack. For example, the first segment S2 may be divided into a plurality of second segments SG21 to SG2N as illustrated in FIG. 9. In a substantially similar manner, the first segment S1 may be divided into a plurality of second segments SG11 to SG1N. The first segment S3 may be divided into a plurality of second segments SG31 to SG3N. The first segment S4 may be divided into a plurality of second segments SG41 to SG4N. The first segment S5 may be divided into a plurality of second segments SG51 to SG5N.

As shown in FIG. 5, Steps S4 to S8 are repeated recursively until the stack becomes empty. If step S5 determines that the stack is empty, the operation proceeds to Step S9 to output the document image divided into a plurality of segments, and the operation ends. For example, as illustrated in FIG. 10, a background area may be extracted from the document image of FIG. 6. The document image of FIG. 10 is thus divided into a plurality of segments using the background area as a separator. Based on the segmented document image of FIG. 10, layout of the document image, such as its character lines, paragraphs, or columns, may be analyzed.

The operation shown in FIG. 5 may be performed in various other ways as apparent to those skilled in the art.

For example, in order to extract the first set of white rectangles r1 in Step S2, which may be selected so as to function as a column separator, the white rectangles having a shape not appropriate for the column separator may be eliminated based on statistical information obtained from the document image. By using the statistical information, the white rectangles, which have large areas but fail to function as the column separator, may be eliminated.

The statistical information includes information regarding a standard character size, a standard space between characters ("a standard character space"), and a standard space between character lines ("a standard character line space"), etc., which may be obtained by analyzing black pixels and white pixels in the document image. In one example, a standard character size s of the document image may be estimated using the black rectangles extracted in Step S1. The white rectangle r1 having a width or height smaller than the value (b * s) may be eliminated, as it may correspond to a space between characters. In this exemplary embodiment, the value b corresponds to an arbitrary constant.

Figure 11:
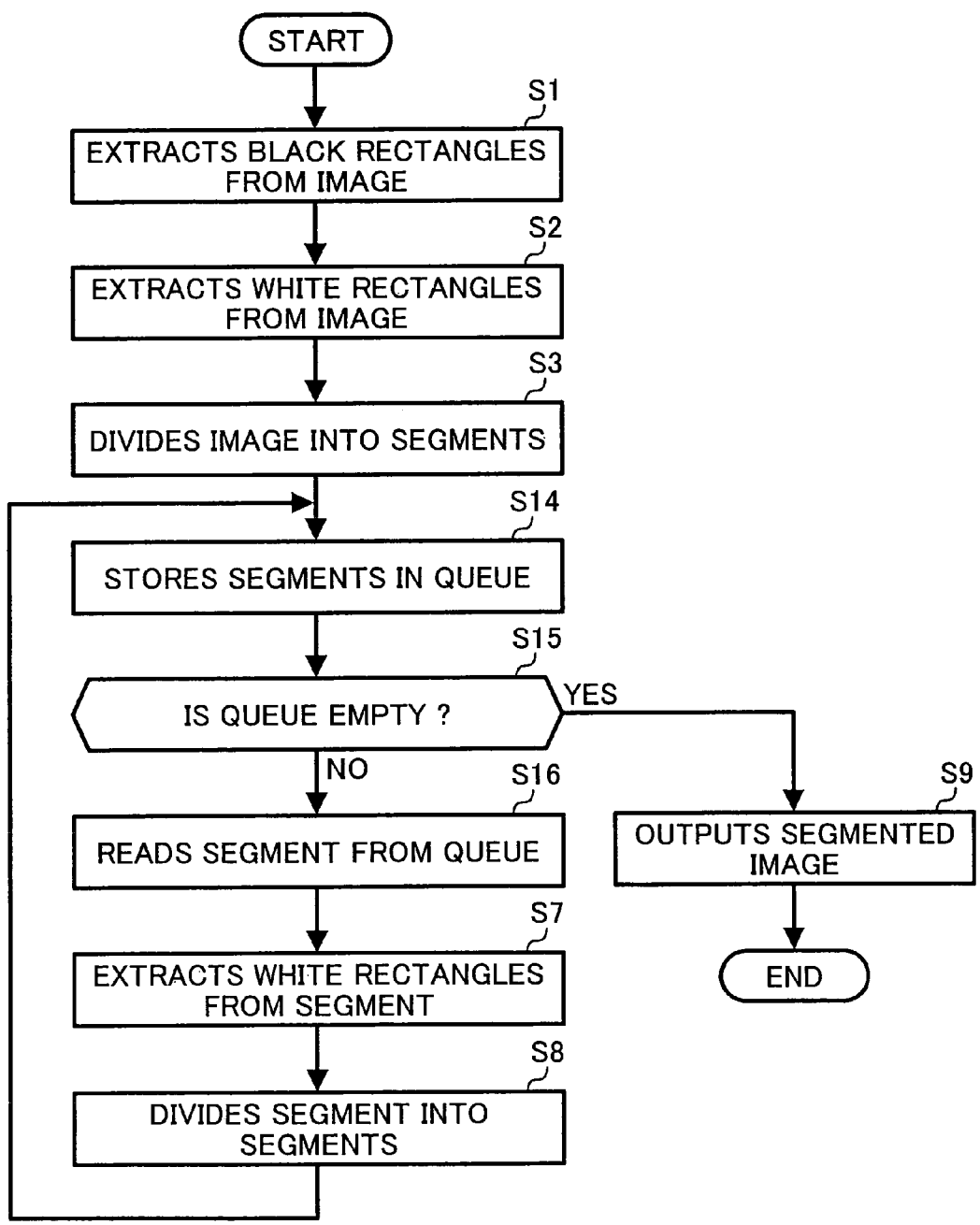
FIG. 11 is a flowchart illustrating an operation of extracting a background area of a document image, according to an exemplary embodiment of the present invention.

Referring now to FIG. 11, an operation of extracting a background area of a document image is described according to an exemplary embodiment of the present invention. The operation illustrated in FIG. 11 is substantially similar to the operation illustrated in FIG. 5. The differences include replacement of Step 4 with Step 14, replacement of Step S5 with Step S15, and replacement of Step S6 with Step S16.

Step S14 stores the plurality of first segments in a queue in an order determined by the order of extracting the first set of white rectangles r1. In this exemplary embodiment, the first segment generated using the white rectangle r1 having the largest evaluation function value is stored first, while the first segment generated using the white rectangle r1 having the smallest evaluation function value is stored last.

Step S15 determines whether the queue is empty. If the queue is empty ("YES" in Step S15), the operation proceeds to Step S9. Otherwise ("NO" in Step S15), the operation proceeds to Step S16.

Step S16 reads the first segments from the queue in a predetermined order. In this exemplary embodiment, the first segment stored first is read first, while the first segment stored last is read last.

Figure 12:
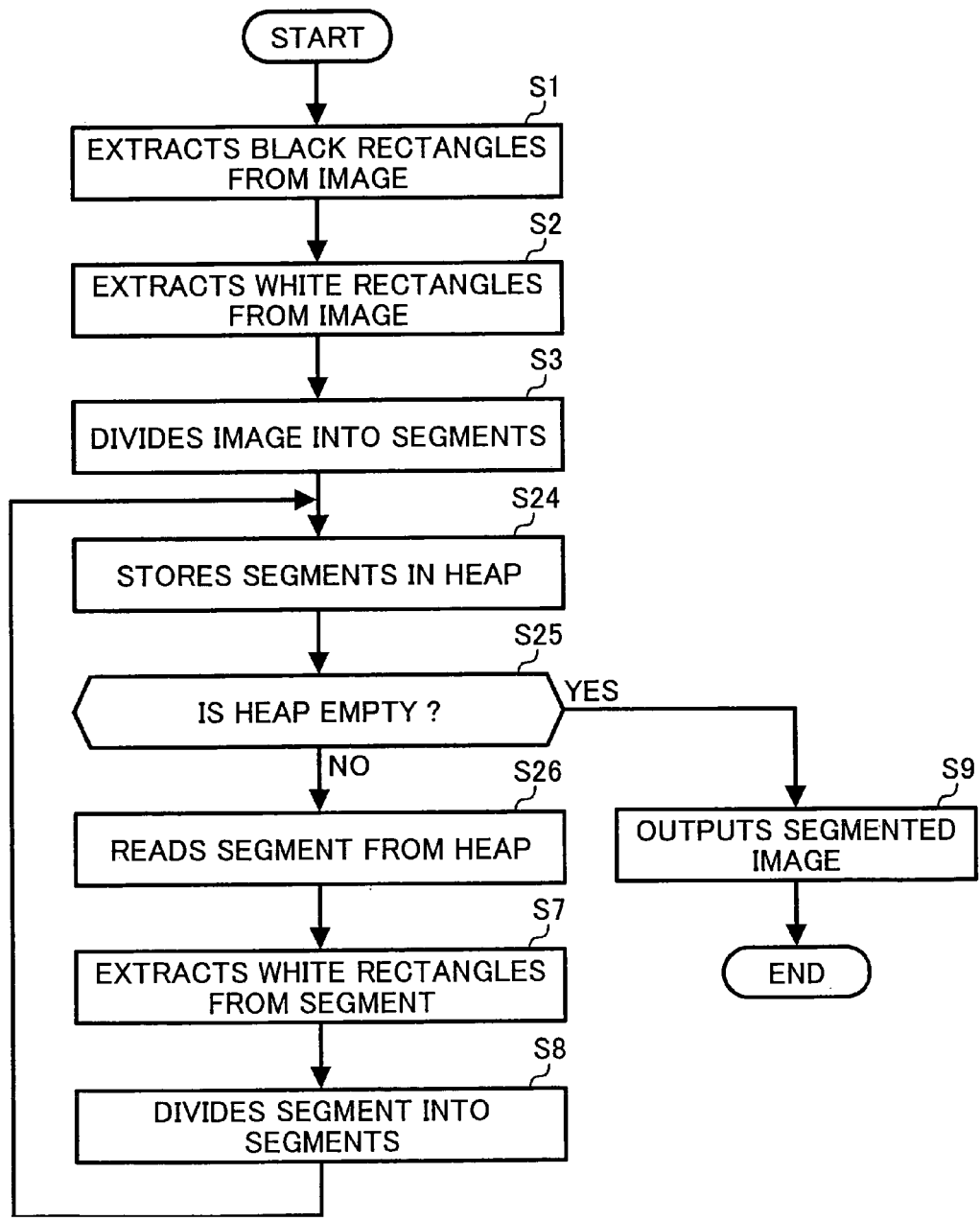
FIG. 12 is a flowchart illustrating an operation of extracting a background area of a document image, according to an exemplary embodiment of the present invention.

Referring now to FIG. 12, an operation of analyzing layout of a document image is described according to an exemplary embodiment of the present invention. The operation illustrated in FIG. 12 is substantially similar to the operation illustrated in FIG. 5. The differences include replacement of Step S4 with Step S24, replacement of Step S5 with Step S25, and replacement of Step S6 with Step S26.

Step S24 stores the plurality of first segments in a heap in an order determined by the areas of the first segments. In this exemplary embodiment, the first segment having the largest area is stored first, while the first segment having the smallest area is stored last.

Step S25 determines whether the heap is empty. If the heap is empty ("YES" in Step S25), the operation proceeds to Step S9. Otherwise ("NO" in Step S25), the operation proceeds to Step S26.

Step S26 reads the first segments from the heap in a predetermined order. In this exemplary embodiment, the first segment stored first is read first, while the first segment stored last is read last.

Figure 13:
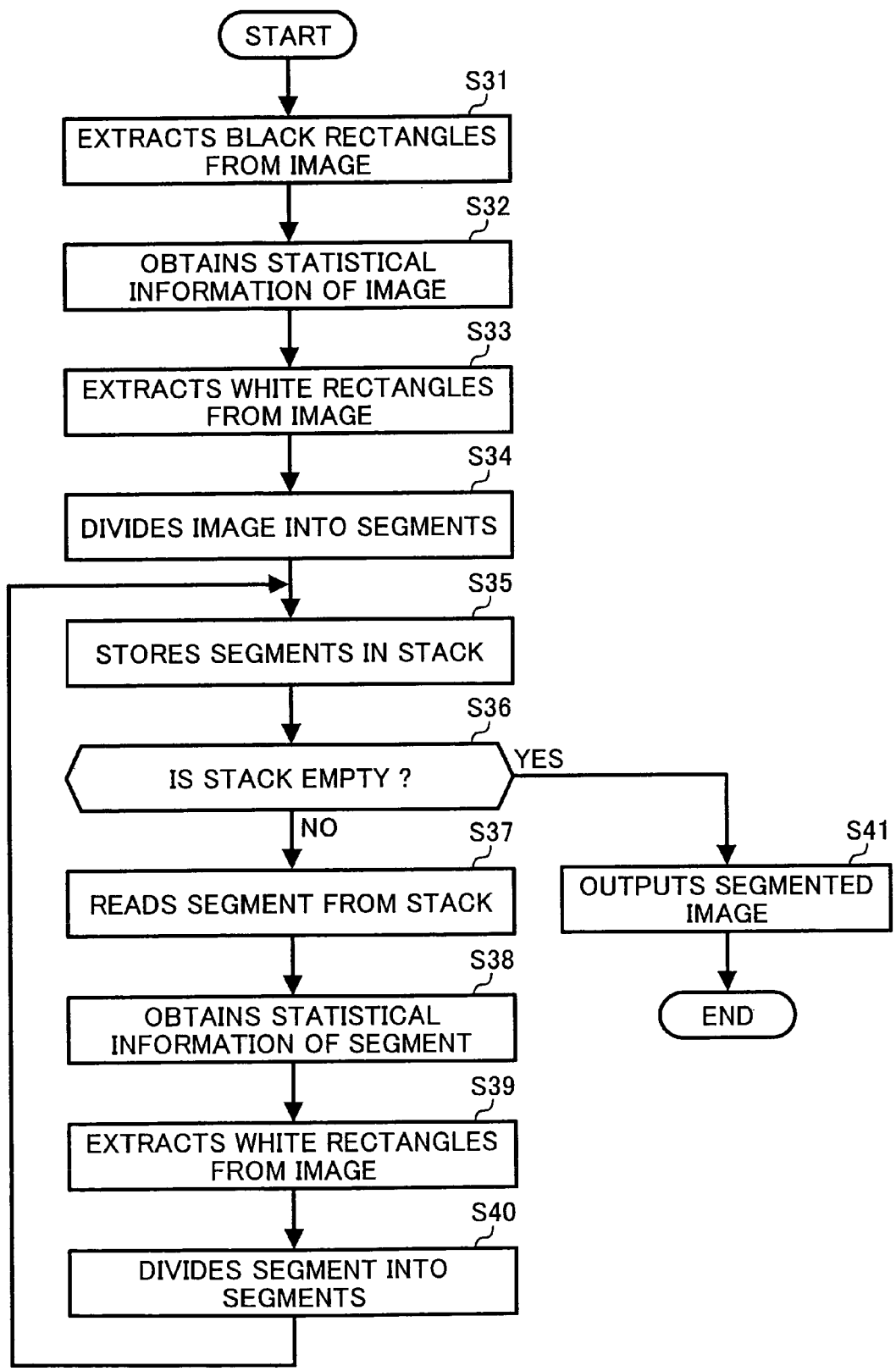
FIG. 13 is a flowchart illustrating an operation of extracting a background area of a document image, according to an exemplary embodiment of the present invention.

Referring now to FIG. 13, an operation of extracting a background area of a document image is described according to an exemplary embodiment of the present invention. The steps illustrated in FIG. 13 are performed by the CPU 2 when a command is input through the keyboard 12 or the pointing device 13. Upon receiving the command, the CPU 2 generates a binary document image from a document image input to the image processing apparatus 1. Further, the CPU 2 may apply pre-processing to the document image. For example, the CPU 2 may correct skew of the document image, if the document image is skewed. In another example, the CPU 2 may reduce noise components in the document image, for example, by converting a continuous run of white pixels having relatively a small length to a continuous run of black pixels.

Figure 14:
FIG. 14 is an illustration of a plurality of black rectangles extracted from a document image according to an exemplary embodiment of the present invention.

Step S31 extracts a plurality of black rectangles $r_i$ from the binary document image, in a substantially similar manner as described referring to Step S1 of FIG. 5. As a result, a plurality of black rectangles $r_i$ may be obtained as illustrated in FIG. 14.

Step S32 obtains statistical information of the document image. In this step, at least one of a standard character size, standard character space, and standard character line space may be obtained as the statistical information.

Figure 15:
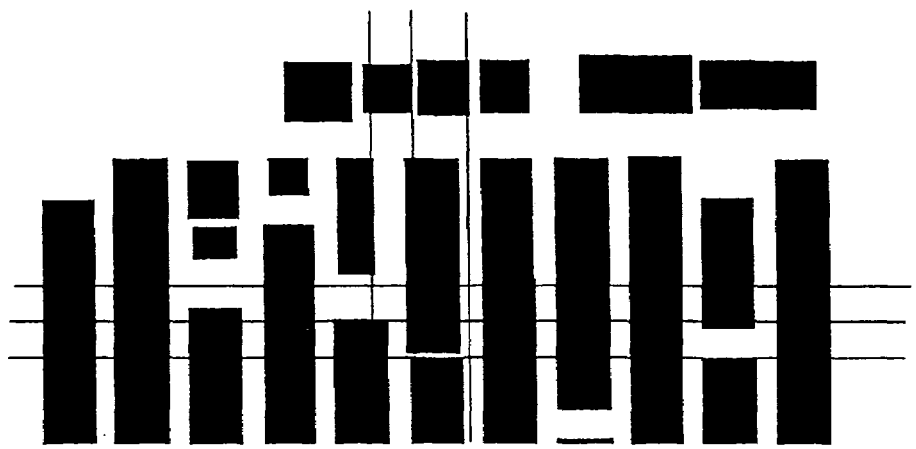
FIG. 15 is an illustration of an operation for obtaining statistical information of a document image according to an exemplary embodiment of the present invention.

For example, as illustrated in FIG. 15, a plurality of continuous runs of black pixels ("black pixel runs") may be detected along vertical and horizontal scanning lines. Based on the detected black pixel runs, a histogram showing the distribution of the lengths of the detected black pixel runs is generated. The mode of this histogram can be used as the standard character size s of the document image.

Similarly, still referring to FIG. 15, a plurality of continuous runs of white pixels ("white pixel runs") may be detected along vertical and horizontal scanning lines. Based on the detected white pixel runs, a histogram showing the distribution of the lengths of the detected white pixel runs is generated. The mode having a larger number of samples can be used as the standard character line space d of the document image. The mode having a smaller number of samples can be used as the standard character space c of the document image.

Step S33 extracts a first set of white rectangles r1 in a substantially similar manner as described referring to Step S2 of FIG. 5. However, in this exemplary embodiment, the statistical information obtained in Step S32 is additionally used to define the lower boundary value t.

For example, the standard character size s may be additionally used as described in the following equation:

$$t = a*s*\min(w, h).$$

Using the statistical information obtained from the document image, the evaluation function, which is determined based on the heuristics, may become more reliable.

Figure 16:
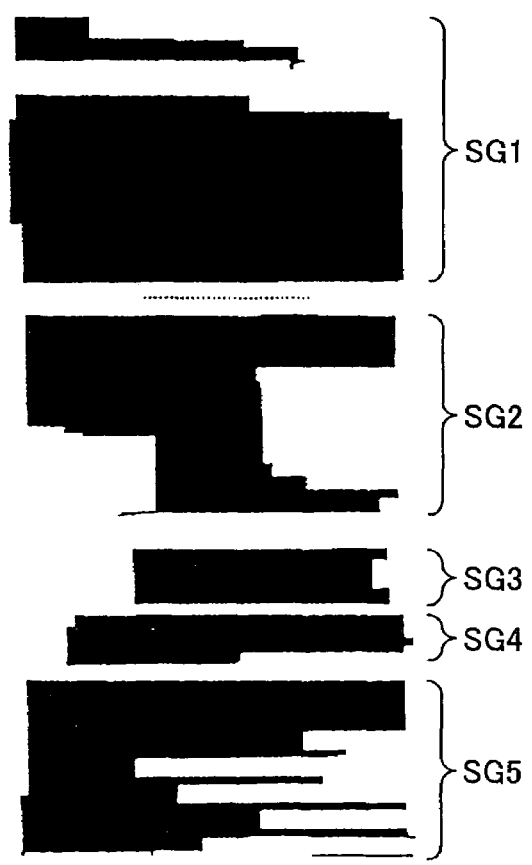
FIG. 16 is an illustration of a first set of white rectangles extracted from a document image according to an exemplary embodiment of the present invention.

Step S34 divides the document image into a plurality of first segments using the first set of white rectangles r1 as a separator, in a substantially similar manner as described referring to Step S3 of FIG. 5. As illustrated in FIG. 16, the document image of FIG. 14 may be divided into five first segments SG1, SG2, SG3, SG4, and SG5.

Figure 17:
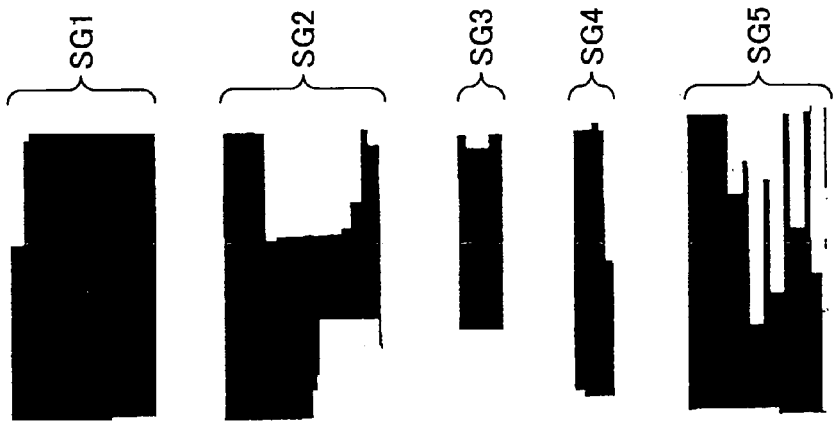
FIG. 17 is an illustration of a plurality of first segments according to an exemplary embodiment of the present invention.

Step S35 stores the plurality of first segments in a stack in an order determined by the order of extracting the white rectangles r1, in a substantially manner as described referring to Step S4 of FIG. 5. As a result, all the first segments SG1 to SG5 are stored in the stack as illustrated in FIG. 17

Step S36 determines whether the stack is empty. If the stack is empty ("YES" in Step S36), the operation proceeds to Step S41. Otherwise ("NO" in Step S36), the operation proceeds to Step S37.

Step S37 reads the first segments from the stack in a predetermined order, in a substantially similar manner described referring to Step S6 of FIG. 5.

Step S38 obtains statistical information from each of the first segments read in Step S37. In this step, at least one of a standard character size, standard character line space size, and standard character space size may be obtained as the statistical information of the first segment.

Figure 18:
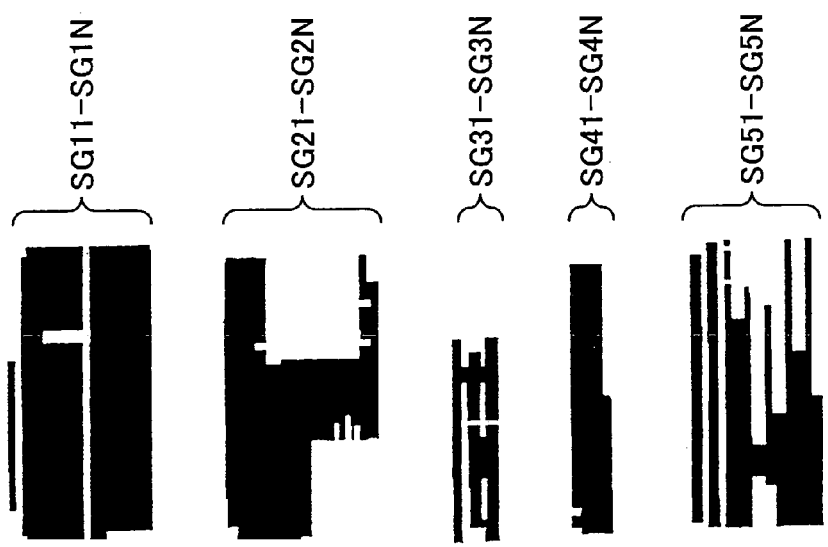
FIG. 18 is an illustration of a plurality of second segments according to an exemplary embodiment of the present invention.

Step S39 extracts a second set of white rectangles r2 from each of the first segments read in Step S37. For example, as illustrated in FIG. 18, a second set of white rectangles r2 may be extracted from the segments SG 1 to 5 in a substantially similar manner as descried referring to Step S33. In this step, however, the lower boundary value t may be obtained by using only the statistical information as described in the following equation:

$t=a*s*d$, wherein the value a corresponds to an arbitrary constant, the value s corresponds to the standard character size of the first segment, and the value d corresponds to the standard character line space of the first segment.

Using the statistical information obtained from the document image, the evaluation function, which is determined based on the heuristics, may become more reliable. In a substantially similar manner, the first segment S1 may be divided into a plurality of second segments SG11 to SG1N. The first segment S3 may be divided into a plurality of second segments SG31 to SG3N. The first segment S3 may be divided into a plurality of second segments SG31 to SG3N. The first segment S4 may be divided into a plurality of second segments SG41 to SG4N. The first segment S5 may be divided into a plurality of second segments SG51 to SG5N.

Step S40 divides each of the first segments into a plurality of second segments using the second set of white rectangles r2 as a separator, and returns to Step S35 to store the second segments in the stack. For example, the first segment S2 may be divided into a plurality of second segments SG21 to SG2N as illustrated in FIG. 18.

Figure 19:
FIG. 19 is an illustration of a background area extracted from a document image according to an exemplary embodiment of the present invention.

As shown in FIG. 13, Steps S35 to S40 are repeated recursively until the stack becomes empty. If Step S36 determines that the stack is empty, the operation proceeds to Step S41 to output the document image divided into a plurality of segments, and the operation ends. For example, as illustrated in FIG. 19, a background area may be extracted from the document image of FIG. 14. The document image of FIG. 14 is thus divided into a plurality of segments using the background area as a separator. Based on the segmented document image of FIG. 14, layout of the document image may be analyzed, such as its character lines, paragraphs, or columns.

The operation shown in FIG. 13 may be performed in various other ways as apparent to those skilled in the art.

For example, in order to extract the second set of white rectangles r2 in Step S39, which may be selected so as to function as a paragraph separator, the white rectangles having a shape not appropriate for the paragraph separator may be eliminated based on the statistical information obtained from the first segment or the document image. By using the statistical information, the white rectangles, which have large areas but fail to function as the paragraph separator, may be eliminated.

Referring to the above-described operation, the white rectangle r1 having a height smaller than the value (f * s) may be eliminated, as it may correspond to a space between characters, with the value f corresponding to an arbitrary constant. Alternatively, the white rectangle r1 having a width smaller than the value (g * d) may be eliminated, as it may correspond to a space between character lines, with the value g corresponding to an arbitrary constant. Alternatively, the white rectangle r1 having a width smaller than the value (h * c) may be eliminated, as it may correspond to a space between characters, with the value h corresponding to an arbitrary constant.

Further, any one of the segments generated by dividing the document image may be stored in a queue or a heap, as described in the operations shown in FIG. 11 or 12.

Figure 20:
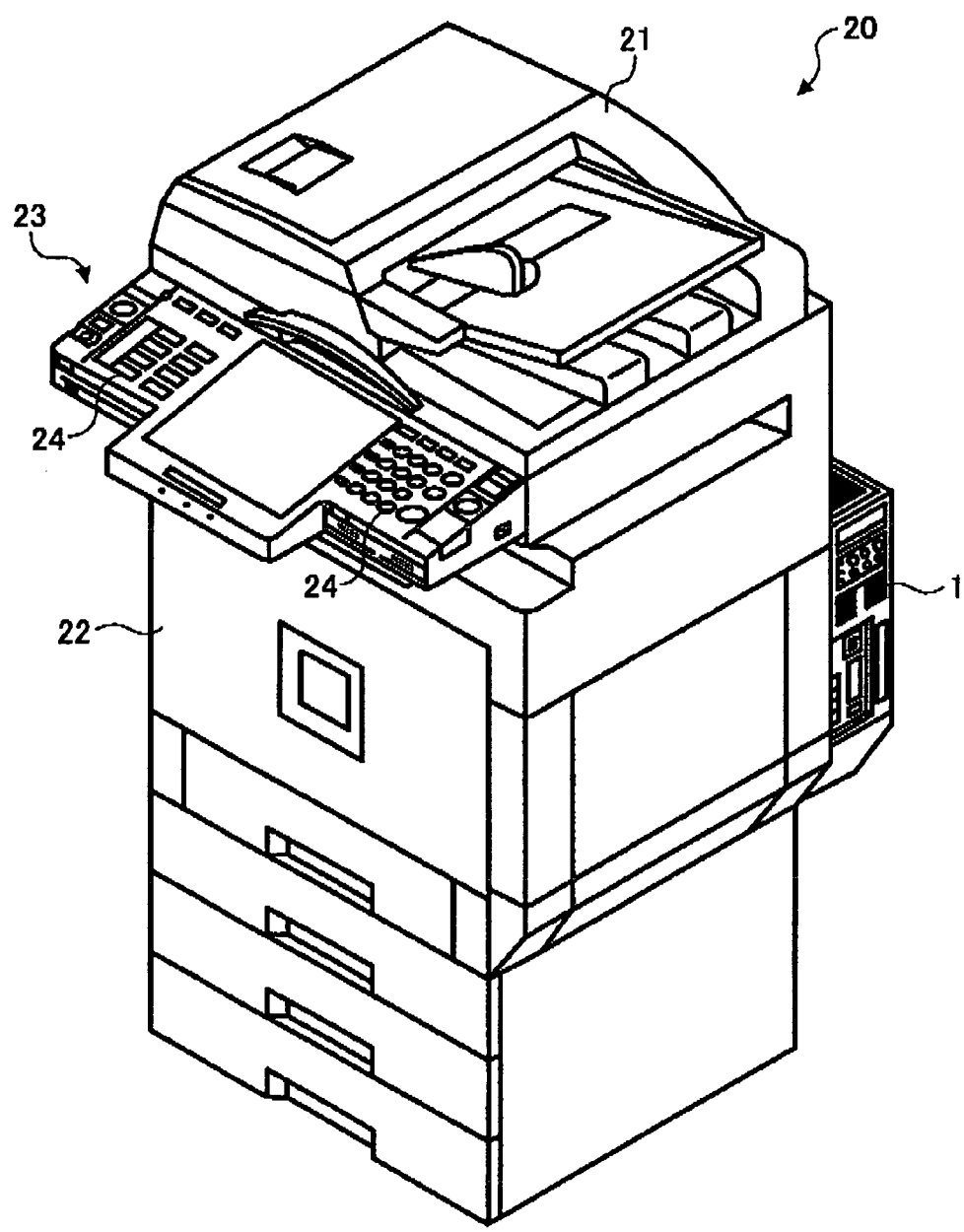
FIG. 20 is a perspective view illustrating a structure of an image forming apparatus according to an exemplary embodiment of the present invention.

The image processing apparatus 1 of FIG. 4 may be used in combination with any other device as illustrated in FIG. 20. The image forming apparatus 20 shown in FIG. 20 mainly includes a scanner 21, a printer 22, and the image processing apparatus 1. Further, the image forming apparatus 20 is provided with an operational panel 23 with a plurality of keys 24.

In an exemplary operation, the scanner 21 scans an original document into a document image, and inputs the document image to the image processing apparatus 1. The image processing apparatus 1 analyzes layout of the document image, and outputs an analysis result to the printer 22. The printer 22 prints out the analysis result, such as the document image divided into a plurality of segments.

In another exemplary operation, the scanner 21 scans an original document into a document image, and inputs the document image into the image processing apparatus 1. The image processing apparatus 1 analyzes layout of the document image, and displays an analysis result on the operational panel 23, such as the document image divided into a plurality of segments.

Figure 21:
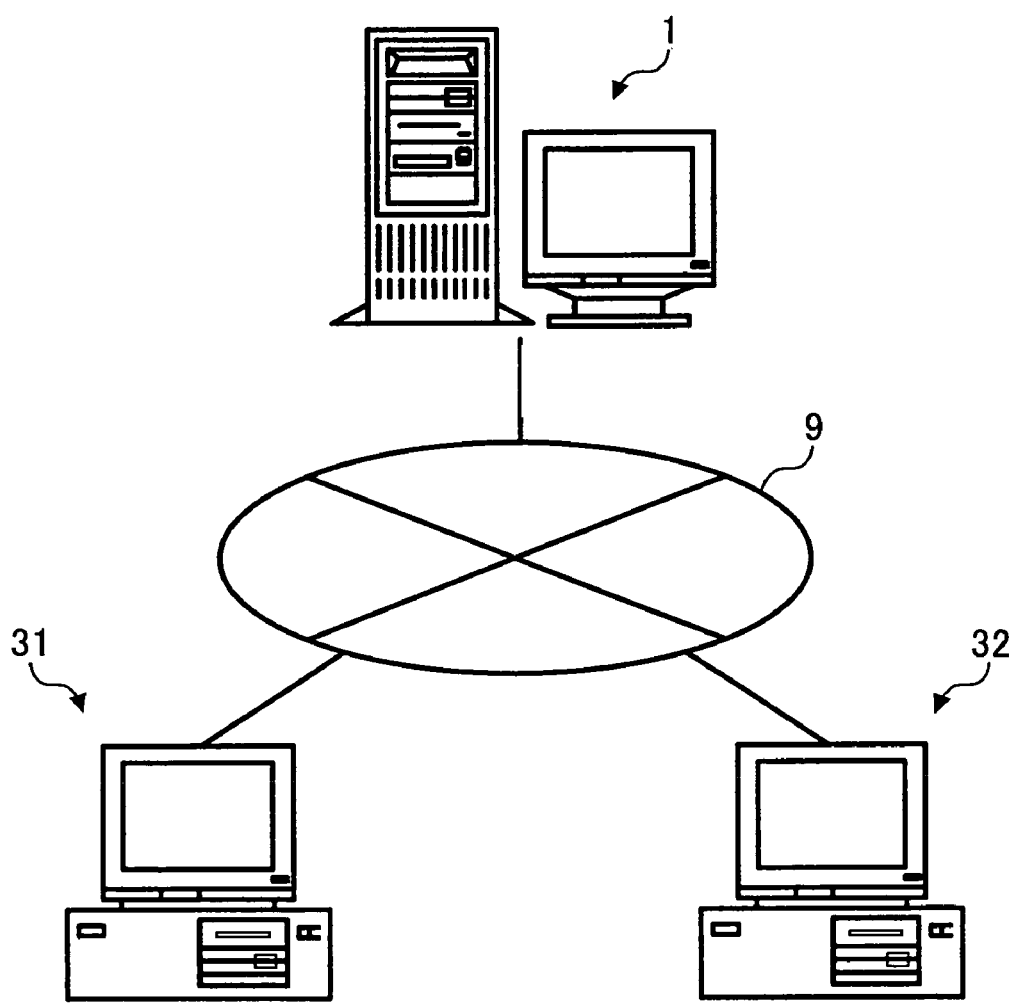
FIG. 21 is a view illustrating a structure of an image processing system according to an exemplary embodiment of the present invention.

Further, the image processing apparatus 1 may function as a server in a server-client network system, for example, as illustrated in FIG. 21. The server-client network system of FIG. 21 includes the image processing apparatus 1 functioning as a server, and two image processing apparatuses 31 and 32 each functioning as a client, which are connected via the network 9.

In an exemplary operation, the image processing apparatus 31 sends a document image to the image processing apparatus 1. The image processing apparatus 1 analyzes layout of the document image, and provides an analysis result to the image processing apparatus 31, such as the document image divided into a plurality of segments.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

Further, the white rectangles or black rectangles may not be rectangles in shape. The image processing apparatus 1 may be capable of extracting the white rectangles or black rectangles, having non-rectangular shapes, from the document image.

Furthermore, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The invention claimed is:

1. An apparatus for extracting a background area of a document image, comprising:
   means for extracting a set of white rectangles from a processed area of the document image;
   means for dividing the processed area into a plurality of segments using the set of white rectangles as a separator;
   means for storing the plurality of segments; and
   means for reading-out the plurality of segments in a predetermined order as a processed area, the predetermined order being defined differently for different types of data structures used as storing means for the plurality of segments,
   wherein the extracting means, the dividing means, the storing means, and reading means repeat recursively the functions of extracting, dividing, storing, and reading, until the background area of the document image is extracted.

2. The apparatus of claim 1, wherein the extracting means comprises:
   means for extracting a plurality of white rectangles covering white pixels of the document image, including the set of white rectangles;
   means for calculating an evaluation function value for each of the plurality of white rectangles;
   means for obtaining a lower boundary value of the evaluation function; and
   means for selecting one or more white rectangles from the plurality of white rectangles as the set of white rectangles based on the evaluation function values.

3. The apparatus of claim 2, wherein the selecting means comprises:
   means for eliminating one or more white rectangles having the evaluation function values smaller than the lower boundary value.

4. The apparatus of claim 3, wherein the selecting means further comprises:
   means for listing the plurality of white rectangles in an order determined by the evaluation function values.

5. The apparatus of claim 1, further comprising:
   means for extracting a plurality of black rectangles covering black pixels from the processed area of the document image, wherein the set of white rectangles is extracted from an area excluding the plurality of black rectangles.

6. The apparatus of claim 2, wherein the evaluation function value corresponds to an area of the white rectangle.

7. The apparatus of claim 2, wherein the lower boundary value is defined based on a dimension of the processed area.

8. The apparatus of claim 2, wherein the extracting means further comprises:
   means for obtaining statistical information of the processed area.

9. The apparatus of claim 8, wherein the lower boundary value is defined based on the statistical information.

10. The apparatus of claim 8, wherein the selecting means comprises:
    means for estimating an appropriate dimension of the white rectangle using the statistical information; and
    means for eliminating one or more white rectangles having inappropriate dimensions different from the appropriate dimension.

11. The apparatus of claim 1, further comprising:
    means for outputting the document image divided into plurality of segments.

12. The apparatus of claim 4, wherein the predetermined order of the reading means corresponds to the order of the listing means.

13. A method of extracting a background area of a document image, comprising the steps of:
    using a processor for:
    extracting a set of white rectangles from a processed area of the document image;
    dividing the processed area into a plurality of segments using the set of white rectangles as a separator;
    storing the plurality of segments in a memory;
    reading-out the plurality of segments from the memory in a predetermined order as a processed area, the predetermined order being defined differently for different types of data structures used to store the plurality of segments, wherein the steps of extracting, dividing, storing, and reading are repeated recursively by the processor until the background area of the document image is extracted.

14. The method of claim 13, wherein the extracting step further comprises the steps of:
    extracting a plurality of white rectangles covering white pixels of the document image, including the set of white rectangles;
    calculating an evaluation function value for each of the plurality of white rectangles;
    obtaining a lower boundary value of the evaluation function; and
    selecting one or more white rectangles from the plurality of white rectangles as the set of white rectangles based on the evaluation function values.

15. The method of claim 13, further comprising the step of:
    using the processor for:
    outputting the document image divided into the plurality of segments.

16. An image processing system, comprising:
    a processor; and
    a storage device configured to store a plurality of instructions which, when activated by the processor, cause the processor to perform an image processing operation comprising the steps of:
    inputting a document image including a background area;
    extracting a set of white rectangles from a processed area of the document image;
    dividing the processed area into a plurality of segments using the set of white rectangles as a separator;
    storing the plurality of segments in a memory; and
    reading-out the plurality of segments in a predetermined order from the memory as a processed area, the predetermined order being defined differently for different types of data structures used to store the plurality of segments, wherein the steps of extracting, dividing, storing, and reading are repeated recursively until the background area of the document image is extracted.

17. The system of claim 16, wherein the predetermined order of the reading step corresponds to a data structure of the memory.

18. The system of claim 16, wherein the image processing operation further comprises the step of:
    outputting the document image divided into the plurality of segments.

19. A computer readable medium storing computer instructions for performing an image processing operation comprising:
    inputting a document image including a background area;
    extracting a set of white rectangles from a processed area of the document image;
    dividing the processed area into a plurality of segments using the set of white rectangles as a separator;
    storing the plurality of segments; and
    reading-out the plurality of segments in a predetermined order as a processed area, the predetermined order being defined differently for different types of data structures used to store the plurality of segments, wherein the steps of extracting, dividing, storing, and reading are repeated recursively until the background area of the document image is extracted.

20. The medium of claim 19, wherein the image processing operation further comprises the step of:
    outputting the document image divided into the plurality of segments.

* * * * *

UNITED STATES PATENT AND TRADEMARK OFFICE
CERTIFICATE OF CORRECTION

| | | |
|---|---|---|
| PATENT NO. | : 7,616,813 B2 | Page 1 of 1 |
| APPLICATION NO. | : 11/201366 | |
| DATED | : November 10, 2009 | |
| INVENTOR(S) | : Hirobumi Nishida | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1091 days.

Signed and Sealed this

Nineteenth Day of October, 2010

David J. Kappos
*Director of the United States Patent and Trademark Office*